F. HAINSWORTH.

Apparatus for Ventilating Water-Closets.

No. 5,807. Reissued March 24, 1874.

Witnesses:
J Mason Gozzler
H. P. Simpson

Inventor:
Frederick Hainsworth
by Sherburne & Co
Attorneys

AM. PHOTO-LITHOGRAPHIC Co. N. Y. (OSBORNE'S PROCESS.)

UNITED STATES PATENT OFFICE.

FREDERICK HAINSWORTH, OF CHICAGO, ILLINOIS.

IMPROVEMENT IN APPARATUS FOR VENTILATING WATER-CLOSETS.

Specification forming part of Letters Patent No. 75,010, dated March 3, 1868; reissue No. 5,807, dated March 24, 1874; application filed March 16, 1874.

*To all whom it may concern:*

Be it known that I, FREDERICK HAINSWORTH, of Chicago, in the county of Cook and State of Illinois, have invented a new and Improved Method of Ventilating Water-Closets; and I do hereby declare the following to be a full, clear, and exact description thereof, which will enable others skilled in the art to which my invention appertains to make and use the same, reference being had to the accompanying drawing forming part of this specification, in which—

Figure 1:
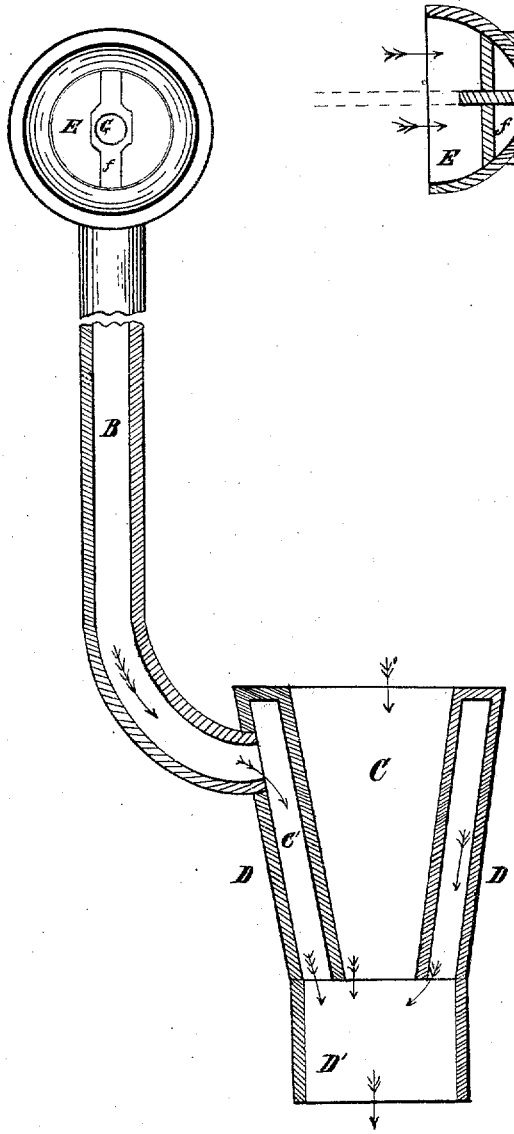
Figure 2:
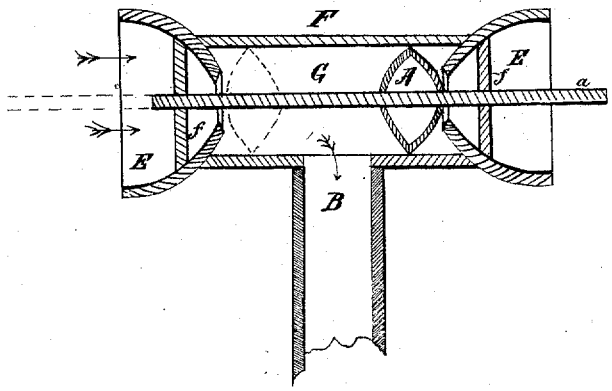

Figure 1 is a side elevation of my said invention, a portion of which is broken away, showing a central section of the ventilating pipe and seat; and Fig. 2 is a longitudinal central section of the upper or cap portion of the pipe detached.

Similar letters of reference indicate like parts in both figures of the drawing.

My invention relates to that class of water-closets used in steamboats and railway-cars, and its object is to provide a means for removing the impure air from the room; and, to that end, it consists in a ventilating-pipe communicating with the interior of the seat and extending upward through the roof, and provided with an air-gathering cylinder, all of which will be more fully understood by the following description:

In the drawing, D is the bowl forming the ordinary privy-seat. C is an inner bowl or casing, which is so arranged within the bowl D as to form an annular air-chamber, C′, between the two walls of the same, as shown in Fig. 1. Permanently attached to the side of the bowl D, near its upper end, and communicating with chamber C′, is a pipe, B, which extends upward through the roof and slightly above the same. Mounted on the upper end of this pipe is an open cylinder, F, which is so attached to the pipe as to allow its cavity to communicate with the cavity of the pipe, by which means a current of air is allowed to descend to the chamber C′ through pipe B. Permanently secured to each end of the cylinder are funnels E E, which communicate with the interior of the same. Attached to the inner portion of the funnels, and extending across the cavity of the same, are guide-bars *f f*, within which is loosely secured an adjusting-rod, G. This rod is so arranged within the braces as to admit of a free and easy longitudinal movement. Mounted on this rod is a valve, A, which is so arranged as to rest against and tightly close one of the funnels as the rod is moved in the direction of its length by the pressure of air against the opposite face of the valve.

In using my invention on railway-cars or steamboats I arrange the cylinder so as to cause the funnels to face the ends of the car or boat, and by the current of air which is produced by the forward motion of the car or boat the valve A is forced against the opposite funnel, closing the same, and the current of air passes in full force downward through pipe B into and through chamber C′, and, by the extension D′ of bowl D, the air is prevented from immediately passing off, which causes the same to receive sufficient momentum to draw the central column of air extending up through bowl C downward, and the latter passes off as indicated by arrows in Fig. 1, thus keeping the atmosphere in the apartment above pure and healthful.

Having thus described my invention, I claim—

1. In combination with the bowl of a water-closet seat the ventilating-pipe and air-gathering cylinder, as specified.

2. In combination with the bowls D and C, arranged to form the chamber C′, the pipe B, cylinder F, and valve A, substantially as and for the purpose specified.

The above specification of my invention signed by me this 25th day of February, 1874.

FREDERICK HAINSWORTH.

Witnesses:

N. H. SHERBURNE,

J. HAINSWORTH.